Nov. 18, 1941.  A. J. FAUSEK ET AL  2,262,928
VALVE
Filed Jan. 2, 1940
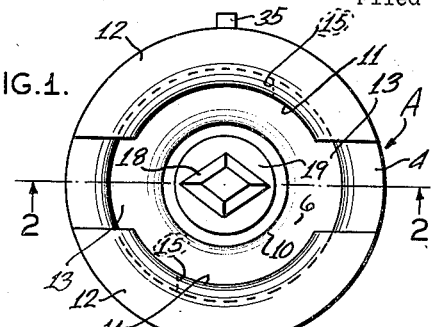
INVENTORS
ARTHUR J. FAUSEK
IRWING F. FAUSEK
BY
ATTORNEY.

Patented Nov. 18, 1941

2,262,928

UNITED STATES PATENT OFFICE 2,262,928

VALVE

Arthur J. Fausek and Irwing F. Fausek, Clayton, Mo.

Application January 2, 1940, Serial No. 312,051

3 Claims. (Cl. 284—14)

This invention relates generally to valves and more specifically to valves of the type known as lager valves and adapted for use in association with beer containers for sealing the containers until they are tapped and for excluding dirt and other foreign matter from the beer containers after the contents have been withdrawn therefrom, the predominant object of the invention being to provide a valve of this type which may be formed from sheet metal instead of from castings as was usually the case heretofore.

For many years prior to this invention lager valves have been used which were produced largely from castings, and when lager valves of this construction were employed with wooden beer containers, such as the old style barrels and kegs, they functioned in a highly efficient manner. However, of late years, great numbers of beer containers have been used which are formed of metal, stainless steel, for instance, and it has been found that when lager valves made up of castings which were not formed with stainless steel were used with stainless steel containers, or containers lined with stainless steel, a galvanic action was usually set up which was highly undesirable in that it affected the beer contained in the containers. Also it has been found that when the lager valves were nickelplated the plating was frequently removed from the valve parts by the galvanic action mentioned. To eliminate the production of the troublesome galvanic action mentioned above, attempts were made to produce lager valves from castings made of stainless steel but because of the hardness of this material and for other reasons, the machining operations required to prepare the castings for use as parts of the valves were rendered so expensive as to preclude economical production of the valves.

The main purpose of the present invention, therefore, is to provide a lager valve which may be produced from sheet metal instead of castings as heretofore. By so producing lager valves they may be made of stainless steel, or other desired metal, and no expensive machining operations of the valve parts are required. Also because the lager valves are made from the same material from which the associated containers, or the linings thereof, are made no galvanic action will be set up between the containers, or their linings, and the lager valves when said assembled containers and lager valves are in use.

Fig. 1 is a plan view of the improved valve.

Fig. 2 is a vertical section taken on line 2—2 of Fig. 1.

Fig. 3 is a vertical section taken on line 3—3 of Fig. 2.

Fig. 4 is a view partly in horizontal section and partly in plan taken on line 4—4 of Fig. 3.

Figs. 5, 6, and 7, are fragmentary vertical sections illustrating modifications of the invention relating to the provision of the bottom wall of the valve body.

Fig. 8 is still another modified form of the invention.

In the drawing, wherein are shown for the purpose of illustration, merely, several embodiments of the invention, A designates generally in Figs. 1, 2, 3, and 4, one form of lager valve of the present invention. The lager valve A includes a valve body 1 which is formed of sheet metal, said valve body being of hollow, cylindrical form and being provided with a bottom wall 2 through which a centrally located opening 3 is formed which is defined by an upstanding, annular flange 3'. At the top of the valve body a horizontal annular flange 4 is provided which is an outwardly projected extension of the circumferential wall of the valve body. Formed through the bottom wall 2 of the valve body is a pair of oppositely disposed, arcuate valve apertures 5 which serve as passageways through which beer passes when the valve, in use, is in an open condition.

Formed in the body 1 of the valve A is an inwardly extended portion 6 which comprises annular wall portions 7 which are integral portions of the circumferential wall of the valve body and which diverge in an inward direction therefrom as shown in Figs. 2 and 3, said divergent wall portions being joined at their inner ends by a vertically disposed, annular wall 8 which is formed integral with said divergent walls and defines an opening 9 which is extended vertically through the valve body, centrally thereof. The inwardly extended portion 6 of the valve body 1 may be formed in said valve body in any suitable manner, such, for instance, as by rolling, or with the aid of die means, or pressure means, or in various other ways which would be familiar to persons skilled in the art to which the invention relates. At the annular point where the upper divergent wall 7 joins the vertical annular wall 8, an annular face 10 is provided which serves as an elevated valve seat as will be hereinafter explained.

Disposed in the upper portion of the valve body 1 is a pair of opposed elements 11 of arcuate formation, the outer faces of said elements being in contact with the inner face of the circumferential wall of the valve body, and horizontal flange portions 12, which constitute parts of said elements, contacting with the top face of the horizontal flange 4 at the top of the valve body in overlapping relation with respect thereto. The elements 11 are secured in place within the valve body in any suitable manner, such for instance, as by welding, soldering, or otherwise, said elements being so disposed with respect to each other that passageways 13 are provided at opposite sides of the valve body, and within same, between corresponding ends of said elements. Each of the elements 11 is provided with a lower, inclined face which provides a cam face 14, said cam face extending from one end of the element to a vertical face 15 which is a part of a downwardly projected extension 16 formed on said element.

Associated with the body 1 of the valve A is a valve stem 17 which, at its upper end, is provided with a noncircular head portion 18, said noncircular head portion at its lower end being provided with a flange 19 which contacts with one of a plurality of washers 20 interposed between said flange 19 and the top edge of the annular flange 3' which defines the opening 3 of the bottom wall 2 of the valve body 1. The portion 21 of the valve stem located immediately below the flange 19 of the head portion 18 of said valve stem, is circular in cross-section and is disposed in the opening 3 of the valve body with its circumferential face contacting with the inner face of the upstanding annular flange 3'. The portion 22 of the valve stem 17 located immediately below the circular portion 21 is provided with opposed, flat faces, as shown in Fig. 4, which gives to this stem section an elongated, noncircular cross-sectional shape, and the portion 23 of the valve stem located below the portion 22 thereof is circular in cross-section and is externally screwthreaded throughout a portion of its length.

Mounted on the valve stem 17 is a valve head which includes an element 24 shaped as shown to the best advantage in Figs. 2, 3, and 4, said element comprising a central portion 25 from which flared portions 26 extend outwardly in opposite directions. The central portion of the element 24 is provided with a centrally located, noncircular opening, which corresponds in shape and size with the cross-section of the portion 22 of the valve stem, and said portion 22 of the valve stem extends through the noncircular opening of the element 24. The valve head includes also a member 27 which comprises a lower sleeve portion 28, a horizontal wall 29, and a marginal upstanding flange 30. The upper portion of the member 27 corresponds in shape with the element 24 and said element 24 rests on the horizontal wall 29 of said member 27 and is surrounded by the upstanding flange thereof. The valve head structure likewise includes a facing 31, formed of rubber or other suitable material, said facing being arranged as shown to the best advantage in Figs. 2 and 3. In other words the top face of the facing material is arranged in close contact with the lower face of the bottom wall 2 of the valve body 1 and a portion 31a of said facing material is disposed between the outer edge of the element 24 and the inner face of the marginal flange 30 of the member 27. Also portions 31b are extended into apertures 24' of the element 24, and a portion 31c of said facing material overlaps the top edge of the upstanding flange 25' which surrounds the opening formed centrally through the element 24.

The lower sleeve portion 28 surrounds the portion 23 of the valve stem 20 and said sleeve portion is of such diameter relative to the diameter of the stem portion 23 that an annular space is present between the inner face of the sleeve portion and the outer face of the stem portion 23. This annular space receives packing 32 to which pressure is applied by a gland 33 which is mounted on the stem portion 23, a nut 34 being mounted on the stem portion 23 in contact with the gland 33 in order to prevent unintended rotation of said gland with respect to said stem portion 23.

In the use of the improved lager valve said valve is disposed in an opening formed in a beer container in the usual manner, a projection 35 which is extended from the valve body being extended into a cavity formed in the container so as to prevent rotation of the valve body with respect to the opening of the container. When, in the use of the improved lager valve, it is desired to tap or vent a container with which the valve is associated the appropriate fitting (not shown) is associated with the lager valve by passing a portion of said fitting downwardly into the valve, laterally extended lugs on the fitting passing downwardly through the vertical passageways 13 between corresponding ends of the elements 11, a valve portion of the fitting moving in contact with the valve seat 10, and a noncircular socket portion of the fitting moving into embracing relation with respect to the noncircular head 18 of the valve stem 17 of the valve. The fitting is then rotated in a clockwise direction to rotate the laterally extended lugs of the fitting in contact with and with respect to the cam faces 14 on the elements 11. This rotation of the fitting will force the valve portion of the fitting into tight contact with the valve seat 10 of the valve because of movement of the laterally extended lugs of the fitting in contact with the cam faces 14 of the elements 11, and simultaneously the valve stem 17 of the valve will be rotated to move the portions of the valve head which close the valve apertures 5 of the valve, away from said apertures. When the contents of the container have been withdrawn therefrom the valve may be closed by reversing the direction of rotation of the fitting to move portions of the valve head to positions where they close the valve apertures 5 and to bring the laterally extended lugs of the fitting in line with the vertical passageways 13 of the valve body. The fitting is then moved outwardly relative to the valve body to disengage said fitting from the valve, the laterally extended lugs of the fitting passing through the passageways 13 of the valve body.

In Fig. 5 is illustrated a modified form of the invention according to which the valve body 1a is provided with a separate bottom wall 2a instead of an integral bottom wall as shown in Figs. 2 and 3, this form of the invention being important where it is desired to provide the valve body with a heavier bottom wall. In Fig. 5 the lower portion of the circumferential wall of the valve body is recessed as indicated at 36 to receive a portion of the bottom wall, an annular shoulder 36' being provided at the top of the recess with which an annular portion of the top face of the bottom wall 2a contacts. Also the bottom wall is provided at its lower portion with an annular projected portion 37 and the top annular face of this projected portion provides an annular shoulder which contacts with the lower edge of the circumferential wall of the valve body. The bottom wall of the structure shown in Fig. 5 is secured to the circumferential wall of the valve body by welding, soldering, or otherwise, and said bottom wall is provided with a centrally disposed opening 3a, corresponding to the opening 3 of Figs. 2 and 3, and valve apertures 5a corresponding to the valve apertures 5 of Figs. 2 and 3.

Fig. 6 illustrates another modified form of the invention which is quite similar to the form illustrated in Fig. 5. In Fig. 6 the bottom wall 2b is arranged with respect to the lower portion of the valve body 1b so that the lower edge of the circumferential wall of the valve body contacts with the top face of said bottom wall, and an annular, upstanding, marginal flange 38 formed on said bottom wall embraces the lower portion of the circumferential wall of the valve body in contact therewith. The bottom wall 2b of Fig. 6 is secured to the valve body by welding, soldering, or otherwise, and said bottom wall is provided with a centrally located opening 3b and valve apertures 5b which correspond to the opening 3 and valve apertures 5 of Figs. 2 and 3.

In Fig. 7 is illustrated still another form of the invention according to which the bottom wall 2d of the valve body 1d is formed integral with the circumferential wall of the valve body as in Figs. 2 and 3. However, to strengthen the bottom wall 2d, when this is desired, an insert 39 is arranged in contact with the top face of the bottom wall, said insert being of such size that its marginal edge contacts with the inner face of the circumferential wall of the valve body. In order to secure the insert 39 in place within the valve body 1d an inwardly extended bead 40 is formed on the circumferential wall of the valve body, said bead being in engaging and overlapping relation with respect to the marginal edge portion of the insert. The insert is provided with a centrally located opening 41 which is alined with an opening 3d formed in the bottom wall 2d of the valve body, and also said insert is provided with valve apertures 42 which are alined with similar valve apertures 5d formed through said bottom wall 2d of the valve body.

Fig. 8 illustrates yet another form of the invention relating to the valve body, which closely resembles the structure of Figs. 1 to 4, inclusive. In Fig. 8 the valve body 1e includes an inwardly and upwardly inclined, annular wall 43 which is formed integral with the circumferential wall of the valve body, the circumferential wall of the lower portion 44 of the valve body being formed integral with said inclined wall 43 and being extended downwardly and outwardly from the inner portion of said inclined wall 43. At the junction of the inner portion of the inclined wall 43 and the circumferential wall of the lower portion 44 of the valve body 1e an elevated valve seat 45 is provided, and the bottom wall 2e of the valve body 1e is provided with a central opening 3e and opposed valve apertures 5e. Within the upper portion of the valve body, elements 11e are suitably secured in place, these elements 11e being similar to the elements 11 of Figs. 1, 2, and 3 and are adapted to perform the same function performed by said elements 11.

We claim:

1. A lager valve comprising a hollow, cylindrical valve body having a wall at one end thereof which partially closes said hollow, cylindrical valve body at said end, said end wall having an opening formed therethrough substantially centrally thereof and being provided with a valve aperture formed therethrough, an annular portion extended inwardly from the side wall of said valve body into the interior of said valve body and defining an opening which is located centrally of the valve body, said annular portion being formed by displacing inwardly a portion of the circumferential wall of said cylindrical valve body to provide an annular seat within the valve body adapted to receive in contact therewith a fitting adapted for association with the lager valve, a cam face located within said valve body which is adapted to be engaged by a portion of said fitting so as to cam said fitting into operative relation with said valve seat upon rotation of said fitting relative to said valve body, a valve stem extended through the centrally located opening of said end wall of the valve body, and a valve head rotatable with said valve stem in contact with said end wall of the valve body and with respect to the valve aperture therein.

2. A lager valve comprising a hollow, cylindrical valve body having a wall at one end thereof which partially closes said hollow, cylindrical valve body at said end, said end wall having an opening formed therethrough substantially centrally thereof and being provided with a valve aperture formed therethrough, an annular portion of substantially U-shaped formation in cross-section extended inwardly and upwardly from the side wall of said valve body into the interior of said valve body, said annular portion being formed by displacing inwardly a portion of the circumferential wall of said cylindrical valve body to provide an annular seat within the valve body adapted to receive in contact therewith a fitting adapted for association with the lager valve, a cam face located within said valve body which is adapted to be engaged by a portion of said fitting so as to cam said fitting into operative relation with said valve seat upon rotation of said fitting relative to said valve body, a valve stem extended through the centrally located opening of said end wall of the valve body, and a valve head rotatable with said valve stem in contact with said end wall of the valve body and with respect to the valve aperture therein.

3. A lager valve comprising a hollow, cylindrical valve body having a wall at one end thereof which partially closes said hollow, cylindrical valve body at said end, said end wall having an opening formed therethrough substantially centrally thereof and being provided with a valve aperture formed therethrough, an insert secured within said valve body parallel with and in contact with the end wall of said valve body, said insert being provided with a central opening and a valve aperture which register with the central opening and the valve aperture of said end wall of the valve body, an annular portion extended inwardly from the side wall of said valve body into the interior of said valve body which provides an annular seat within the valve body adapted to receive in contact therewith a fitting adapted for association with the lager valve, a cam face located within said valve body which is adapted to be engaged by a portion of said fitting so as to cam said fitting into operative relation with said valve seat upon rotation of said fitting relative to said valve body, a valve stem extended through the centrally located opening of said end wall of the valve body, and a valve head rotatable with said valve stem in contact with said end wall of the valve body and with respect to the valve aperture therein.

ARTHUR J. FAUSEK.
IRWING F. FAUSEK.